US008116829B2

(12) United States Patent
Baker et al.

(10) Patent No.: US 8,116,829 B2
(45) Date of Patent: Feb. 14, 2012

(54) RADIO STATION AND METHOD OF OPERATING A RADIO STATION

(75) Inventors: Matthew P. J. Baker, Canterbury (GB); Timothy J. Moulsley, Caterham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 858 days.

(21) Appl. No.: 12/097,521

(22) PCT Filed: Dec. 19, 2006

(86) PCT No.: PCT/IB2006/054939
§ 371 (c)(1),
(2), (4) Date: Jun. 14, 2008

(87) PCT Pub. No.: WO2007/072414
PCT Pub. Date: Jun. 28, 2007

(65) Prior Publication Data
US 2008/0268786 A1  Oct. 30, 2008

(30) Foreign Application Priority Data

Dec. 22, 2005 (EP) .................................. 05112844

(51) Int. Cl.
*H04B 1/38* (2006.01)
*H04B 1/16* (2006.01)
*H04W 72/00* (2009.01)
(52) U.S. Cl. ................. 455/574; 455/343.21; 455/343.1; 455/571
(58) Field of Classification Search ................... 455/522, 455/68, 69, 67.11, 67.13, 226.2, 226.3, 226.4, 455/571, 474, 343.1, 343.2, 452.1
See application file for complete search history.

(56) References Cited

U.S. PATENT DOCUMENTS

| 5,491,837 | A  | * | 2/1996  | Haartsen ......................... 455/62 |
| 5,594,943 | A  | * | 1/1997  | Balachandran ............... 455/436 |
| 5,884,196 | A  | * | 3/1999  | Lekven et al. ................ 455/574 |
| 5,982,766 | A  | * | 11/1999 | Nystrom et al. .............. 370/347 |
| 6,240,288 | B1 | * | 5/2001  | Wan et al. .................. 455/426.1 |
| 6,295,311 | B1 | * | 9/2001  | Sun ............................. 375/147 |
| 6,560,453 | B1 | * | 5/2003  | Henry et al. .............. 455/67.11 |
| 6,628,972 | B1 | * | 9/2003  | Lee ............................... 455/574 |
| 6,937,873 | B2 | * | 8/2005  | Levy et al. .................... 455/521 |
| 7,047,050 | B1 | * | 5/2006  | Khawand et al. ............. 455/574 |
| 7,245,598 | B2 | * | 7/2007  | Puig-Oses et al. ........... 370/334 |
| 7,447,488 | B2 | * | 11/2008 | Howard et al. ............ 455/179.1 |

(Continued)

FOREIGN PATENT DOCUMENTS
WO    9712475 A1    4/1997
(Continued)

Primary Examiner — Tilahun B Gesesse

(57) ABSTRACT

A first radio station (100) monitors, either continuously or intermittently, a channel for an indication of a transmitted data packet and measures the quality of the channel. The first radio station (100) transmits indications of the measured quality and when the measured quality falls below a quality threshold, it reduces the proportion of time spent monitoring the channel by introducing or increasing time periods when no monitoring takes place, and subsequently increases the time spent monitoring when the quality recovers. A second radio station (200) transmits data packets to the first radio station (100) and receives the indications of measured channel quality. When the measured quality falls below the quality threshold, the second station reduces the proportion of time spent transmitting the data packets to the first radio station (100) by introducing or increasing time periods between transmitted the data packets.

20 Claims, 2 Drawing Sheets

U.S. PATENT DOCUMENTS

| | | |
|---|---|---|
| 7,656,843 B2 * | 2/2010 | Puig-Oses et al. ............ 370/334 |
| 2001/0046870 A1 * | 11/2001 | Stilp et al. .................... 455/456 |
| 2004/0192347 A1 | 9/2004 | Leizerovich et al. |
| 2005/0009527 A1 | 1/2005 | Sharma |
| 2005/0078629 A1 | 4/2005 | Bi et al. |
| 2005/0094561 A1 | 5/2005 | Raaf |
| 2005/0195852 A1 | 9/2005 | Vayanos et al. |

FOREIGN PATENT DOCUMENTS

| | | |
|---|---|---|
| WO | 2004004173 A1 | 1/2004 |

* cited by examiner

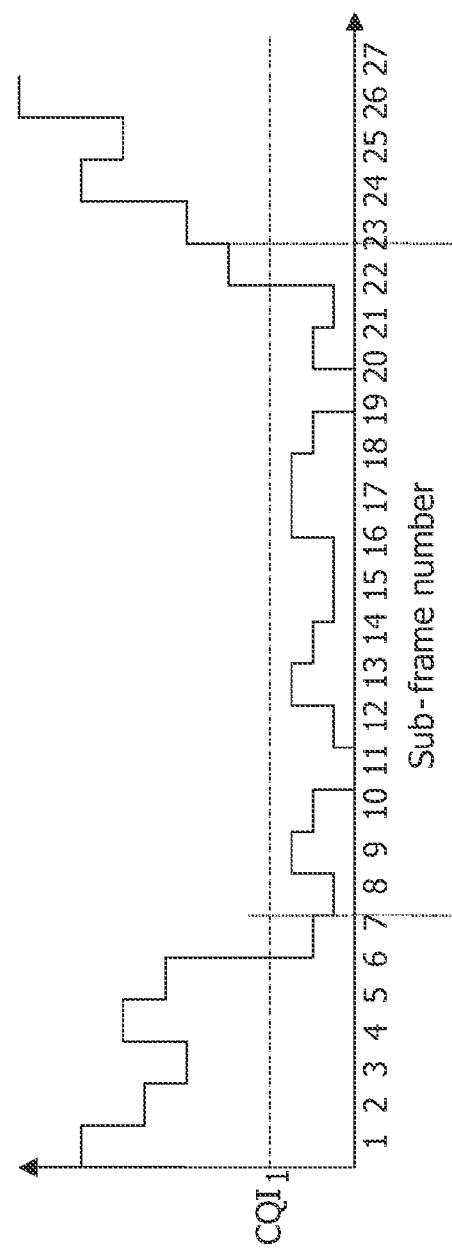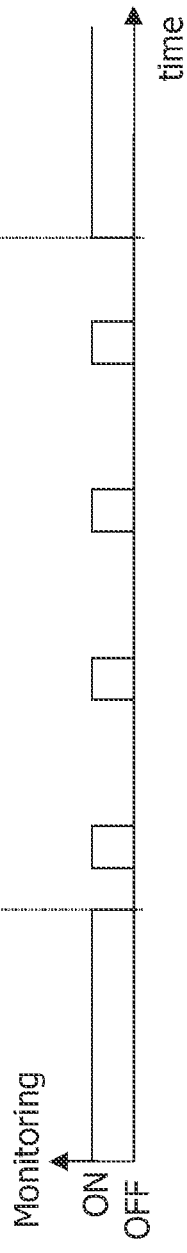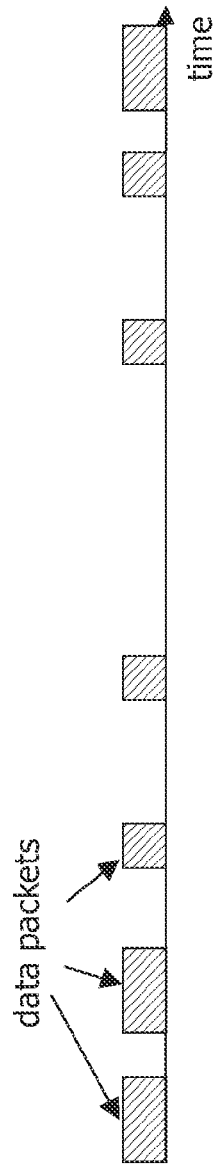

RADIO STATION AND METHOD OF OPERATING A RADIO STATION

FIELD OF THE INVENTION

The invention relates to a method of operating a radio station and to a radio station. The invention has particular, but not exclusive, application to mobile communication systems such as UMTS (Universal Mobile Telecommunication System), especially in relation to the HSDPA (High-Speed Downlink Packet Access) feature of UMTS.

BACKGROUND OF THE INVENTION

In the current High-Speed Downlink Packet Access (HSDPA) feature of UMTS, mobile stations (MSs) make periodic measurements of the received downlink channel quality. These measurements are reported to the serving base station (BS) in the form of indications of a modulation and coding scheme (MCS) that the MS estimates it can decode with a certain probability under the measured channel conditions. These measurement reports are known in UMTS as Channel Quality Indicators (CQI). In each sub-frame, the serving BS uses the CQI reports received from different MSs to select a subset of the MSs (typically those with better channel conditions) to receive a data packet. Each MS receives and decodes one or more control channels (High-Speed Shared Control Channel, HS-SCCH) in each sub-frame in order to ascertain whether the BS has scheduled it to receive a data packet.

In order to simplify the processing in the MS, it is specified in UMTS that packets transmitted to a single MS in consecutive sub-frames must be signalled using the same HS-SCCH. However, in cases when no packet was transmitted to the same MS in the immediately-preceding sub-frame, the MS may be required to monitor up to four HS-SCCHs in order to give sufficient flexibility to the BS's scheduler.

Receiving and decoding the HS-SCCH control channels consumes energy in the receiver and processor of the MS. In order to increase the battery life of the MS, it is desirable to switch off the MS's receiver for as much as possible of the time when data packets are not being received.

One known way of achieving this is to move the MS to a state where it is not required to monitor the HS-SCCHs. The MS can be moved to this state by means of a command transmitted by the BS. However, a relatively long signalling process is then required to move the MS back to a state where it can receive data packets, which increases the delay for packet transmission and can have an adverse effect on user experience.

Another known procedure is to re-configure the operation of the MS in order to reduce the number of sub-frames in which the MS is required to monitor the HS-SCCHs. For example, by means of a command transmitted by the BS, the MS could be instructed to monitor only every $n^{th}$ sub-frame so that it can switch off part or all of its receiver and processor in the other sub-frames. However, this restriction reduces the effectiveness of the scheduling algorithm employed by the BS, as the BS has less freedom to transmit data packets on occasions when the channel conditions to that MS are most suitable.

SUMMARY OF THE INVENTION

An object of the invention is to enable improvements in the monitoring of a channel by a radio station.

According to a first aspect of the invention there is provided a method of operating a radio station, comprising:
monitoring either continuously or intermittently a first channel for an indication of a transmitted data signal;
measuring the quality of a second channel;
transmitting indications of the measured quality;
comparing the measured quality with a first quality threshold; and
in response to the measured quality falling below the first quality threshold, reducing the proportion of time spent monitoring the first channel by introducing or increasing time periods when no monitoring takes place.

Such a method is suitable for a radio station receiving data signals. By reducing the time spent monitoring a channel, the radio station is able to reduce its power consumption when channel quality degrades by switching off the parts of its receiver used for monitoring for indications of transmitted data signals.

Optionally the reduced proportion of time spent monitoring may be operated for a predetermined period of time. This feature has the advantage of simplicity, enabling both the radio station and the station transmitting the monitored signals to schedule tasks ahead for a known time period.

Optionally the reduced proportion of time spent monitoring may be operated until the measured quality increases above a second quality threshold. This feature has the advantage that the proportion of time spent monitoring may be increased as soon as the quality recovers, and therefore avoids unwanted delays. By making the first and second quality thresholds different, hysteresis can be provided to prevent short term oscillation about a single threshold.

Optionally the reduced proportion of time spent monitoring may be operated until a signal having a predetermined characteristic is received. The predetermined characteristic may be an address of the radio station, or may be a predetermined command. This feature has the advantage that the station transmitting the monitored signals can control to some extent the proportion of time spent monitoring by the radio station, including over-riding the independent control by the radio station.

Optionally the first or second quality threshold may be selected dependent on respective received parameter values. This feature has the advantage that the station transmitting the monitored signals can control the quality thresholds. For example, the quality thresholds may be selected dependent on the amount of data traffic, or the spread of qualities of different radio stations in a system or part of a system, in order to improve system throughput.

Optionally, in response to the measured quality falling below the first quality threshold, the proportion of time spent monitoring may be reduced for a plurality of channels. This feature has the advantage of enabling increased power conservation when the indications of transmitted data signals are received on a plurality of channels.

Optionally the second channel is the same channel as the first channel. This feature has the advantage of enabling increased power conservation due to simultaneous monitoring and measurement, or the processing of fewer channels. Otherwise, the monitoring and measurement may be performed on different channels, for example monitoring a data channel and measuring a pilot or control channel.

According to a second aspect of the invention there is provided a method of operating a radio station, comprising:
transmitting data packets to a receiving station;
receiving from the receiving station indications of measured channel quality;

in response to the measured quality falling below a first quality threshold, reducing the proportion of time spent transmitting the data packets to the receiving station by introducing or increasing time periods between transmitting the data packets.

Such a method is suitable for a radio station transmitting data signals to a receiving station. By reducing the proportion of time spent transmitting the data packets to the receiving station, the receiving station is able to reduce the time it spends monitoring a channel, and thereby is able to reduce its power consumption when channel quality degrades, as described above, and the radio station may increase system capacity by devoting more time to communicating with stations that have a good channel quality.

The received indications of measured channel quality may comprise indications of whether the measured channel quality is above or below the first quality threshold, if the receiving station has made such an assessment. Alternatively, the radio station may make such a determination itself, based on the received indications of measured channel quality.

Optionally the reduced proportion of time spent transmitting the data packets to the receiving station may be operated for a predetermined period of time. This feature has the advantage of simplicity, enabling both the radio station and the receiving station to schedule tasks ahead for a known time period.

Optionally the reduced proportion of time spent transmitting the data packets to the receiving station may be operated until the received indications of measured channel quality indicate that the measured channel quality has increased above a second quality threshold. This feature has the advantage that the proportion of time spent transmitting data packets to the receiving station may be increased as soon as the quality recovers, and therefore avoids unwanted delays. By making the first and second quality thresholds different, hysteresis can be provided to prevent short term oscillation about a single threshold.

According to a third aspect of the invention there is provided a radio station, comprising:

monitoring means adapted to monitor either continuously or intermittently a first channel for an indication of a transmitted data signal;

measurement means adapted to measure the quality of a second channel; transmitter means adapted to transmit indications of the measured quality;

comparison means adapted to compare the measured quality with a first quality threshold; and control means adapted to, in response to the measured quality falling below the first quality threshold, reduce the proportion of time spent monitoring the first channel by introducing or increasing time periods when no monitoring takes place.

According to a fourth aspect of the invention there is provided a radio station, comprising:

transmitter means adapted to transmit data packets to a receiving station;

receiver means adapted to receive from the receiving station indications of measured channel quality; and control means adapted to, in response to the measured quality falling below a first quality threshold, reduce the proportion of time spent transmitting the data packets to the receiving station by introducing or increasing time periods between transmitting the data packets.

BRIEF DESCRIPTION OF THE DRAWINGS

The invention will now be described, by way of example only, with reference to the accompanying drawings wherein:

FIG. 3 is a timing diagram illustrating monitoring of a channel, channel quality, and the transmission of data packets.

DETAILED DESCRIPTION OF AN EMBODIMENT

Figure 1:
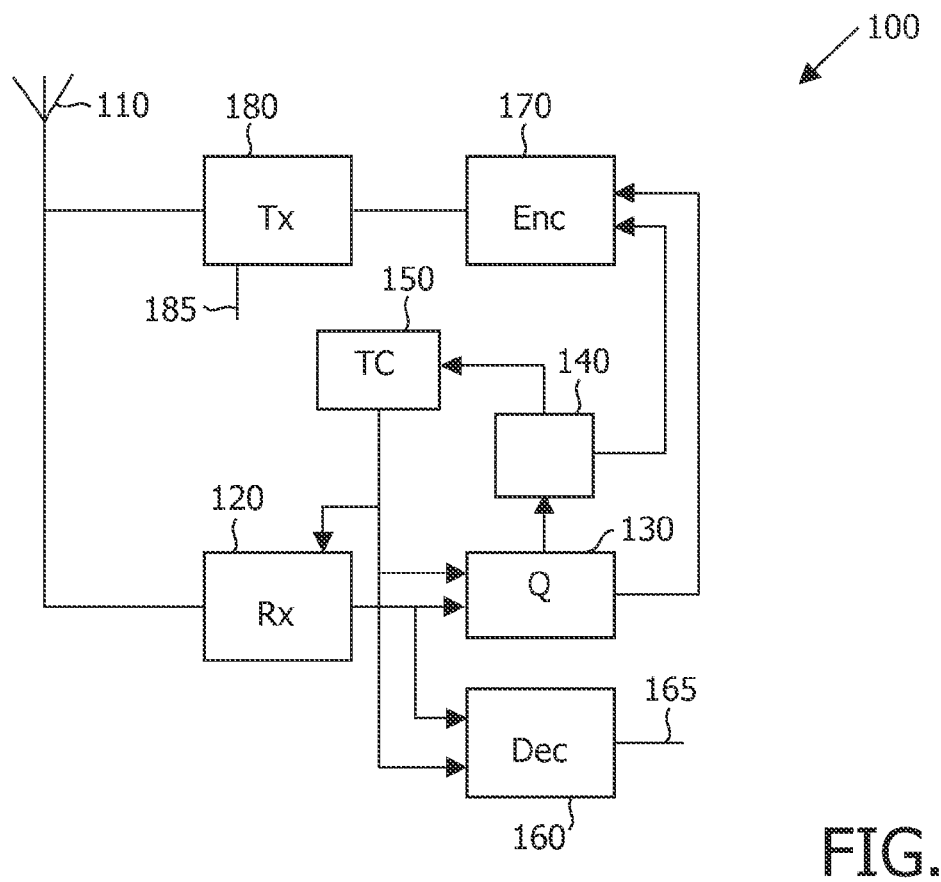
FIG. 1 is a block schematic diagram of a radio station for receiving data packets.

Referring to FIG. 1, there is illustrated a block schematic diagram of a receiving radio station 100 for receiving data packets. It comprises an antenna 110 coupled to an input of a receiver (Rx) 120 for receiving radio signals. An output of the receiver 120 is coupled to an input of a quality measurement stage (Q) 130 for measuring the quality of received signals. The output of the receiver 120 is coupled to an input of a decoder (Dec) 160 for decoding received signals, including an indication that a data packet is being transmitted, the data packets themselves and other signals. Decoding may include determining whether a received signal includes an address of the radio station 100. The decoder 160 has an output 165 for delivering received and decoded data to an application (not illustrated). The decoder 160 may also generate acknowledgements for transmission to indicate successful receipt of a data packet or to request retransmission of a data packet.

An output of the quality measurement stage 130 is coupled to an input of an encoder (Enc) 170 which generates a channel quality indication. An output of the encoder 170 is coupled to an input of a transmitter (Tx) 180 for transmission of the channel quality indications via the antenna 110.

A comparison stage 140 is coupled to an output of the quality measurement stage 130 and is adapted to compare the measured quality with a first, and optionally a second, threshold, in order to determine whether the measured quality is above or below the threshold(s).

A timing control stage (TC) 150 is coupled to the receiver 120, to the decoder 160, and to the quality measurement stage 130 for enabling and disabling these blocks so that power may be conserved during periods of time when no data signals will be received that are addressed to the receiving radio station 100. The timing control stage (TC) 140 is also coupled to an output of the comparison stage 140 and is responsive to the result of the comparison.

When the measured channel quality is good, relative to the first quality threshold, the receiver 120 and decoder 160 may be enabled continuously by the timing control stage 150 to monitor for signals, or may be enabled intermittently with periods of monitoring alternating with periods when the receiver 120, and decoder 160 are disabled in order to conserve power. The intermittent operation may be periodic. In an embodiment suitable for use in UMTS the monitoring may occur, for example, in specific sub-frames.

When the measured channel quality falls below the first quality threshold, the timing control stage 150 controls the receiver 120 and decoder 160 to reduce the proportion of time spent monitoring, thereby enabling increased power conservation. The timing control stage 150 does this by introducing or increasing time periods of no monitoring, during which the receiver 120 and decoder 160 are disabled.

The quality measurement stage 130 may optionally also be enabled and disabled together with the receiver 120 and decoder 160.

The timing control stage 150 may subsequently control the receiver 120 and decoder 150 to increase the proportion of time spent monitoring:
 a) after a predetermined period of time has elapsed since the reduction, such as a fixed period of time or a period of time notified to the receiving radio station 100; or
 b) until the measured quality increases above the second quality threshold, which may be the same as, or higher than, the first quality threshold; or
 c) until a signal having a predetermined characteristic is received, such as a signal comprising a command, or a signal comprising an address of the receiving radio station 100.

Alternatively, other criteria may be applied for determining the duration of operating the reduced proportion of time spent monitoring.

The radio station 100 may select the first or second thresholds dependent on a received parameter value.

Optionally, an output of the comparison stage 140 is coupled to an input of the encoder 170 and the transmitted channel quality indication comprises an indication of whether the measured channel quality is above or below the first or second quality thresholds.

In embodiments where the signal on which the channel quality measurements are made is not subject to closed-loop power control, a further signal may be received which is subject to closed-loop power control. In such embodiments, the quality measurement stage 130 may additionally generate transmit power control (TPC) commands for the signal which is subject to closed-loop power control, based on the quality of the received signal which is subject to closed-loop power control, for transmission to a station 200 that is transmitting data packets to the radio station. In this case, the quality measurement stage 130 may modify the channel quality measurements to include an allowance for changes in channel quality for which corresponding compensatory power control commands were transmitted by the radio station 100 since previously measuring the quality and transmitting an indication of measured quality. For example, if commands have been transmitted to increase the transmit power of the signal which is subject to closed-loop power control, then the quality measurement stage 130 may modify the channel quality measurement to indicate a quality level that is lower than the last-measured-and-reported quality by an amount corresponding to the transmitted power control commands, rather than the last-measured quality level. This feature has the advantage of enabling a more accurate comparison of the prevailing channel quality with the threshold values when the channel quality measurements are made only intermittently. Equivalently, the first or second quality thresholds may be dependent on any power control commands transmitted by the radio station 100 since the previous indication of measured quality was transmitted.

The reduced proportion of time spent monitoring, effected by the timing control stage 150, may be applied to one or more logical or physical channels.

The measuring and monitoring may occur on the same logical or physical channel or on different channels.

Figure 2:
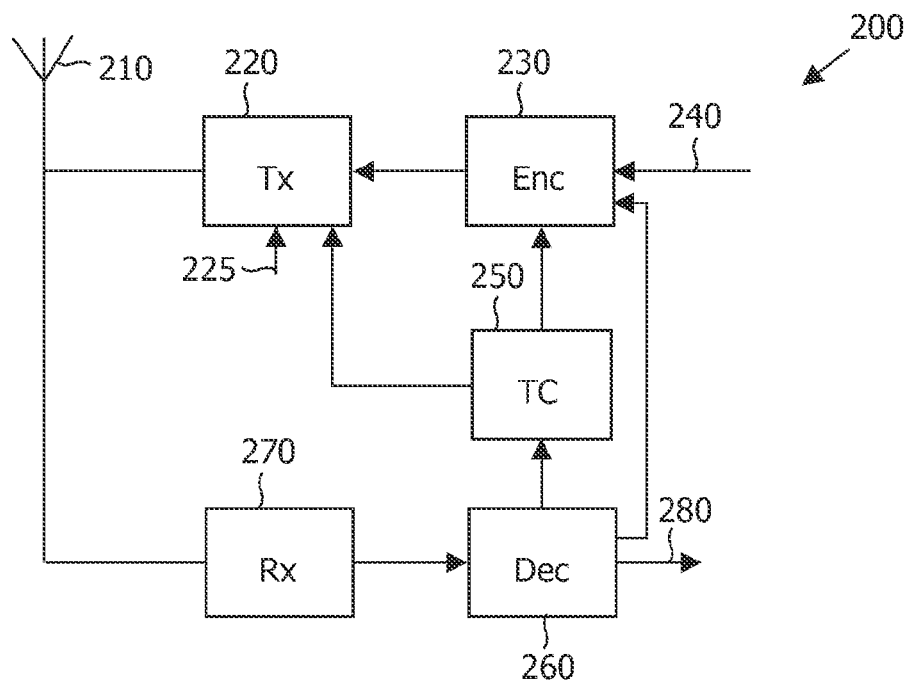
FIG. 2 is a block schematic diagram of a radio station for transmitting data packets.

Referring to FIG. 2, there is illustrated a block schematic diagram of a transmitting radio station 200 for transmitting data packets. There is an encoder (Enc) 230 having an input 240 for data to be transmitted. The encoder 230 encodes data packets, and any other signals, for transmission, which includes where appropriate adding an address of the intended receiving radio station 100. An output of the encoder 230 is coupled to an input of a transmitter (Tx) 220 for transmitting the data packets and other signals, and an output of the transmitter 220 is coupled to an antenna 210.

There is a timing control stage (TC) 250 which is coupled to the encoder 230 and to the transmitter 220 for controlling the time at which data packets are transmitted. There is a receiver (Rx) 270 coupled to the antenna 210 for receiving channel quality indications from the receiving radio station 100 and possibly also acknowledgements transmitted by the receiving radio station 100 in response to receiving the data packets. An output of the receiver 280 may be coupled to an input of a decoder (Dec) 260 for decoding received acknowledgements. An output of the decoder 260 may be coupled to an input of the encoder 230 for enabling transmission of a new data packet if a positive acknowledgement is received indicating that the previous data packet was received successfully, or for enabling retransmission of a previous data packet if a negative acknowledgement is received indicating that a previous data packet was not received successfully. An output of the decoder 260 is coupled to the timing controller 250 for controlling the time at which data packets are transmitted or retransmitted, as described in more detail below.

The timing control stage 250 is responsive to the received channel quality indications. If the channel quality indications indicate that the measured quality has fallen below a first quality threshold, the timing control stage 250 operates to reduce the proportion of time spent transmitting data packets to the receiving radio station 100. For example, in an embodiment suitable for use in UMTS, fewer sub-frames may be used for transmitting data packets to the receiving radio station 100.

The channel quality indications may indicate explicitly whether or not the measured quality is above or below the first quality threshold, or the timing control stage 250 may be adapted to determine whether or not the measured quality is above or below the first quality threshold by comparison of the indicated channel quality with the first threshold.

The timing control stage 250 may subsequently control the transmitter 220 and encoder 230 to increase the proportion of time spent transmitting data packets to the receiving radio station 100:
 a) after a predetermined period of time has elapsed since the reduction, such as a fixed period of time or a period of time notified by the transmitting radio station 200 to the receiving radio station 100; or
 b) until the received channel quality indications indicate that the measured quality has increased above a second quality threshold, which may be the same as, or higher than, the first quality threshold; or
 c) until a signal having a predetermined characteristic is transmitted by the transmitting radio station 200 to the receiving radio station 100, such as a signal comprising a command, or a signal comprising an address of the receiving radio station 100.

Alternatively, other criteria may be applied for determining the duration of operating the reduced proportion of time spent transmitting data packets to the receiving radio station 100.

The timing control stage 250 may further be responsive to power control commands transmitted by the receiving radio station 100. In this case, the timing control stage 250 may modify a decoded received channel quality indication by an amount corresponding to any power control commands received since the channel quality indication was received. For example, if power control commands have been received since the last channel quality indication was received to increase the transmit power of a signal transmitted by the transmitter 220 by an amount, the timing control stage 250 may modify the last-received channel quality indication to indicate a quality level that is lower than the reported quality by an amount corresponding to the received power control commands. Equivalently, the first or second quality thresholds may be dependent on any power control commands received from the radio station 100 since the last-received indication of measured channel quality.

The transmitting radio station 200 may transmit an indication of the first or second quality thresholds to the receiving radio station 100, or vice versa. The thresholds may be specific to a particular receiving radio station 100, or common to a plurality of such stations. Signalling of the channel quality thresholds enables, for example, the transmitting radio station 200 to adapt the monitoring by the receiving radio station 100 to changes in the channel conditions of other radio stations in the cell, and/or to changes in the level of traffic in a cell. For example, if the number of radio stations in a cell with good channel conditions and data to be transmitted increased, the transmitting radio station 200 may raise the threshold below which the receiving radio stations should not monitor the control channels. Conversely, if the channel conditions worsened for receiving radio stations 100 in a cell, or if the traffic loading in the cell reduces, the transmitting radio station 200 may lower a quality threshold, possibly to zero to ensure maximum monitoring.

Referring to FIG. 3, there is illustrated a timing diagram for an embodiment of the invention suitable for UMTS. FIG. 3A is a graph illustrating the variation with sub-frame number of the channel quality measured by a receiving radio station 100. It can be seen that a measurement of channel quality is performed once per sub-frame. FIG. 3B illustrates the times at which a receiving radio station 100 (referred to in this example as a mobile station, MS) monitors an HS-SCCH. FIG. 3C illustrates the times at which data packets are transmitted by a transmitting radio station (referred to in this example as a base station, BS) to the MS.

The BS provides radio coverage for a cell. In response to determining that the current long-term average traffic level in the cell does not generally enable transmissions to take place to MSs with downlink channel quality lower than $CQI_1$, the BS signals the value of $CQI_1$ to one or more MS in the cell. The BS also signals an HS-SCCH monitoring rate to the MSs, indicating how often the MSs should monitor the HS-SCCHs when their downlink channel quality falls below first quality threshold $CQI_1$. In the example shown in FIG. 3, this monitoring rate is set to every $4^{th}$ sub-frame.

As illustrated in FIG. 3B, initially the MS monitors the HS-SCCHs continuously. In sub-frame 6, the MS's reported channel quality falls below $CQI_1$, and the MS modifies its monitoring of the HS-SCCHs in accordance with the previously-received parameters.

Advantageously, the actual sub-frames in which each MS monitors the HS-SCCHs at the reduced rate may be determined by a predetermined relationship with a unique identifier of the MS, for example the first monitored sub-frame may be given by N+(H-RNTI)mod(R), where N is the number of the sub-frame in which the instruction is received from the BS, H-RNTI is the HSDPA Radio Network Temporary Identifier of the MS, and R is the monitoring frequency measured in sub-frames. Thus in FIG. 3B, the first monitored sub-frame after sub-frame 6 is given by 6+(H-RNTI)mod(4), after which the MS monitors every $4^{th}$ sub-frame. The use of a MS-identifier in this way avoids the need to transmit packets to all the MSs with poor channel quality in the same sub-frames. Alternatively, other mechanisms of allocating sub-frames may be used.

In sub-frames 8, 12, 16 and 20, the MS monitors the HS-SCCHs, and any data packets for transmission to the MS during this period are transmitted in these same sub-frames. In the other sub-frames the MS switches off part or all of its receiver and/or processor in order to save power.

In sub-frame 22, the downlink channel quality has improved sufficiently for the MS to be able to report a level higher than $CQI_1$. From this point on, the MS recommences monitoring of every HS-SCCH sub-frame, and the BS has full flexibility to schedule a packet to the MS in every sub-frame.

In this example, the transmitting radio station 200 is a BS and the receiving radio station 100 is an MS. The invention can also be used where the transmitting radio station 200 is an MS and the receiving radio station 100 is a BS, or may be used for peer-to-peer communications between two mobile or fixed stations.

Optionally a plurality of quality thresholds may be employed each with a corresponding proportion of time for monitoring and transmitting data packets.

Although the invention has been described with reference to UMTS, the invention is also applicable to other radio communication systems.

In the present specification and claims the word "a" or "an" preceding an element does not exclude the presence of a plurality of such elements. Further, the word "comprising" does not exclude the presence of other elements or steps than those listed. The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communications and which may be used instead of or in addition to features already described herein.

The invention claimed is:

1. A method of operating a radio station, said method comprising the steps of:
    monitoring, either continuously or intermittently, a first channel for an indication of a transmitted data signal;
    measuring the quality of a second channel;
    transmitting indications of the measured quality;
    comparing the measured quality with a first quality threshold; and
    in response to the measured quality falling below the first quality threshold, reducing the proportion of time spent monitoring the first channel by introducing or increasing time periods when no monitoring takes place.

2. The method as claimed in claim 1, wherein said method further comprises the step of:
    operating the reduced proportion of time spent monitoring for a predetermined period of time.

3. The method as claimed in claim 1, wherein said method further comprises the step of:
    operating the reduced proportion of time spent monitoring until the measured quality increases above a second quality threshold.

4. The method as claimed in claim 3, wherein said method further comprises the step of:
    selecting the second quality threshold dependent on a received parameter value.

5. The method as claimed in claim 3, wherein said method further comprises the step of:
    transmitting an indication of the second quality threshold to the transmitting radio station.

6. The method as claimed in claim 1, wherein said method further comprises the step of:
    operating the reduced proportion of time spent monitoring until a signal having a predetermined characteristic is received.

7. The method as claimed in claim 6, wherein the predetermined characteristic is an address of the radio station.

8. The method as claimed in claim 1, wherein said method further comprises the step of:
    selecting the first quality threshold dependent on a received parameter value.

9. The method as claimed in claim 1, wherein said method further comprises the step of:
    in response to the measured quality falling below the first quality threshold, reducing the proportion of time spent monitoring a plurality of channels.

10. The method as claimed in claim 1, wherein the second channel is the same channel as the first channel.

11. The method as claimed in claim 1, wherein said method further comprises the step of:
    transmitting an indication of the first quality threshold to the transmitting radio station.

12. A method of operating a radio station, said method comprising the steps of:
    transmitting data packets to a receiving station, in response to which the receiving station measures the quality of the channel and transmits indications of measured quality back to the radio station;
    receiving from the receiving station the indications of measured channel quality;
    in response to the indications of measured quality indicating that the measured quality has fallen below a first quality threshold, reducing the proportion of time spent transmitting the data packets to the receiving station by introducing or increasing time periods between transmitting the data packets.

13. The method as claimed in claim 12, wherein the indications of measured channel quality comprise indications of whether the measured channel quality is above or below the first quality threshold.

14. The method as claimed in claim 12, wherein said method further comprises the step of:
    determining whether the measured quality is above or below the first quality threshold.

15. The method as claimed in claim 12, wherein said method further comprises the step of:
    operating the reduced proportion of time spent transmitting the data packets to the receiving station for a predetermined period of time.

16. The method as claimed in claim 12, wherein said method further comprises the step of:
    operating the reduced proportion of time spent transmitting the data packets to the receiving station until the measured channel quality increases above a second quality threshold.

17. The method as claimed in claim 16, wherein said method further comprises the step of:
    transmitting an indication of the second quality threshold to the receiving radio station.

18. The method as claimed in claim 12, wherein said method further comprises the step of:
    transmitting an indication of the first quality threshold to the receiving radio station.

19. A radio station comprising:
    a monitoring stage for monitoring, either continuously or intermittently, a first channel for an indication of a transmitted data signal;
    a quality measurement stage for measuring the quality of a second channel;
    a transmitter for transmitting indications of the measured quality;
    a comparison stage for comparing the measured quality with a first quality threshold; and
    a control stage for, in response to the measured quality falling below the first quality threshold, reducing the proportion of time spent monitoring the first channel by introducing or increasing time periods when no monitoring takes place.

20. A radio station comprising:
    a transmitter for transmitting data packets to a receiving station;
    a receiver for receiving, from the receiving station, indications of measured channel quality; and
    a control stage for, in response to the indications of measured channel quality indicating that the measured quality has fallen below a first quality threshold, reducing the proportion of time spent transmitting the data packets to the receiving station by introducing or increasing time periods between transmitting the data packets.

\* \* \* \* \*